(12) United States Patent
Nakano et al.

(10) Patent No.: US 9,708,951 B2
(45) Date of Patent: Jul. 18, 2017

(54) REDUCING AGENT TANK MODULE

(71) Applicant: KOMATSU LTD., Tokyo (JP)

(72) Inventors: Yuichi Nakano, Komatsu (JP); Takeshi Nakatani, Komatsu (JP)

(73) Assignee: KOMATSU LTD., Tokyo (JP)

( * ) Notice: Subject to any disclaimer, the term of this patent is extended or adjusted under 35 U.S.C. 154(b) by 179 days.

(21) Appl. No.: 14/656,732

(22) Filed: Mar. 13, 2015

(65) Prior Publication Data

US 2016/0265405 A1 Sep. 15, 2016

Related U.S. Application Data

(62) Division of application No. 14/397,482, filed as application No. PCT/JP2014/072124 on Aug. 25, 2014.

(51) Int. Cl.
| | |
|---|---|
| *F01N 3/00* | (2006.01) |
| *F01N 3/20* | (2006.01) |
| *E02F 9/08* | (2006.01) |
| *B60K 13/04* | (2006.01) |
| *E02F 3/76* | (2006.01) |

(52) U.S. Cl.
CPC ............ *F01N 3/2066* (2013.01); *B60K 13/04* (2013.01); *E02F 3/7622* (2013.01); *E02F 9/0883* (2013.01); *B60Y 2200/411* (2013.01)

(58) Field of Classification Search
CPC ...... B60K 13/04; E02F 9/0883; E02F 3/7622; B60Y 2200/411
See application file for complete search history.

(56) References Cited

U.S. PATENT DOCUMENTS

| | | | | |
|---|---|---|---|---|
| 4,090,668 | A * | 5/1978 | Kochenour | B60S 1/481 15/250.04 |
| 4,523,935 | A * | 6/1985 | Takagi | B01D 39/2093 219/205 |
| 5,460,420 | A * | 10/1995 | Perkins | B60K 11/02 293/106 |
| 7,398,771 | B2 * | 7/2008 | Theorell | F01N 3/2066 123/196 AB |

(Continued)

FOREIGN PATENT DOCUMENTS

| | | |
|---|---|---|
| CN | 2745999 Y | 12/2005 |
| CN | 101618737 A | 1/2010 |

(Continued)

OTHER PUBLICATIONS

The Office Action from the corresponding Chinese Patent Application No. 201480001195.X issued on Mar. 2, 2016.

(Continued)

*Primary Examiner* — Jesse Bogue
(74) *Attorney, Agent, or Firm* — Shinjyu Global IP

(57) ABSTRACT

A bulldozer comprises a blade, an engine, a selective catalytic reduction device, a reducing agent tank, and a cab. The engine is disposed behind the blade. The selective catalytic reduction device treats exhaust from the engine. The reducing agent tank stores a reducing agent to be supplied to the selective catalytic reduction device. The cab is disposed behind the engine. The reducing agent tank is disposed on a first side of a lower part of the cab. At least a part of the reducing agent tank overlaps the cab as seen in a top view.

10 Claims, 10 Drawing Sheets

(56) References Cited

U.S. PATENT DOCUMENTS

| | | | |
|---|---|---|---|
| 8,403,099 | B2 | 3/2013 | Yokota |
| 8,708,087 | B2 | 4/2014 | Kashu et al. |
| 9,212,466 | B2* | 12/2015 | Yokota ................. E02F 9/0858 |
| 9,255,382 | B2* | 2/2016 | Noda ........................ E02F 9/16 |
| 9,290,906 | B2 | 3/2016 | Kobayashi et al. |
| 2007/0157602 | A1* | 7/2007 | Gschwind .............. B60K 15/00 60/274 |
| 2007/0163245 | A1* | 7/2007 | Sheridan ............... F01N 3/2066 60/286 |
| 2009/0127265 | A1* | 5/2009 | Magnusson ........... F01N 3/2066 220/564 |
| 2009/0256393 | A1 | 10/2009 | Kim |
| 2012/0067661 | A1 | 3/2012 | Kashu et al. |
| 2012/0174566 | A1 | 7/2012 | Yamashita et al. |
| 2013/0000281 | A1 | 1/2013 | Merchant et al. |
| 2013/0037551 | A1* | 2/2013 | Nishiyama ........... B60K 15/063 220/564 |
| 2013/0277135 | A1 | 10/2013 | Sakai et al. |
| 2013/0327407 | A1* | 12/2013 | Hermann .................. F01N 5/02 137/1 |
| 2014/0290224 | A1 | 10/2014 | Kanamori |
| 2015/0000996 | A1 | 1/2015 | Nagami et al. |
| 2015/0075141 | A1 | 3/2015 | Brueck et al. |
| 2015/0090517 | A1 | 4/2015 | Okuda et al. |
| 2015/0299983 | A1 | 10/2015 | Okamoto et al. |
| 2015/0308077 | A1 | 10/2015 | Arai et al. |
| 2015/0345352 | A1 | 12/2015 | Mitobe et al. |

FOREIGN PATENT DOCUMENTS

| | | |
|---|---|---|
| CN | 103374934 A | 10/2013 |
| CN | 103403267 A | 11/2013 |
| JP | 2007-032108 A | 2/2007 |
| JP | 2009-535253 A | 10/2009 |
| JP | 2010-013095 A | 1/2010 |
| JP | 4615389 B2 | 1/2011 |
| JP | 2011-064132 A | 3/2011 |
| JP | 2012-062691 A | 3/2012 |
| JP | 2012-189048 A | 10/2012 |
| JP | 2013-174044 A | 9/2013 |
| JP | 2013-203329 A | 10/2013 |
| JP | 2013-227729 A | 11/2013 |
| JP | 2014-047551 A | 3/2014 |
| JP | 5439634 B1 | 3/2014 |
| JP | 5501536 B1 | 5/2014 |
| JP | 5501537 B1 | 5/2014 |
| JP | 5508609 B1 | 6/2014 |
| JP | 5576583 B1 | 8/2014 |
| JP | 2015-520823 A | 7/2015 |
| WO | 2007/126366 A1 | 11/2007 |
| WO | 2012/117753 A1 | 9/2012 |
| WO | 2013/174986 A1 | 11/2013 |

OTHER PUBLICATIONS

The International Search Report of Int'l Appln. No. PCT/JP2014/072124 issued on Sep. 30, 2014.
The Written Opinion of the International Searching Authority of Int'l Appln. No. PCT/JP2014/072124 issued on Sep. 30, 2014.
The Office Action from the corresponding Japanese Patent Application No. 2015-029828 issued on Feb. 9, 2016.
The Office Action from the parent U.S. Appl. No. 14/397,482 issued on Dec. 30, 2016.
Official Communication from a co-pending U.S. Appl. No. 14/397,482 issued on Jun. 2, 2017.

* cited by examiner

REDUCING AGENT TANK MODULE

CROSS REFERENCE TO RELATED APPLICATIONS

This is a divisional application of U.S. patent application Ser. No. 14/397,482, filed on Oct. 27, 2014, now pending. This application claims priority to International Application PCT/JP2014/072124, with an international filing date of Aug. 25, 2014. The entire disclosures of U.S. patent application Ser. No. 14/397,482 and International Application PCT/JP2014/072124 are hereby incorporated herein by reference.

FIELD OF THE INVENTION

Some embodiments relate to a bulldozer equipped with a reducing agent tank.

BACKGROUND

Patent Document No. 1 (Japanese Laid-Open Patent Publication No. 2013-174044) discloses a bulldozer in which an upper surface of an engine cover slopes down to the front (see Patent Document No. 1). With this bulldozer the workability is enhanced, since the operator is able visually to check the upper portion of the blade, i.e. of the working implement.

On the other hand, from the standpoint of protection of the natural environment, a bulldozer needs to be equipped with exhaust purification (see Patent Document No. 2, Japanese Laid-Open Patent Publication No. 2013-227729). Therefore, it is nowadays practiced to mount an exhaust treatment device to a bulldozer. Recently, a selective catalytic reduction (SCR) device for treating nitrogen oxides (NOx) is desirably installed as the exhaust treatment device. When a selective catalytic reduction device is installed in a bulldozer, a reducing agent tank also needs to be mounted on the bulldozer. Moreover, the capacity of the reducing agent tank is necessarily determined such that a ratio of the capacity of reducing agent tank to the capacity of a fuel tank is equal to or greater than a certain value.

SUMMARY

According to the invention disclosed in Patent Document No. 1, on the rear side of boxes disposed on the cab which stretch from the left and right sides of the cab to the left and right of the rear of the cab, a fuel tank and a hydraulic fluid tank and the like are disposed. An engine cooling module such as a radiator is disposed behind the cab. The boxes have very little excess space because a battery and a frame for the ROPS structure and so on are disposed in addition to the fuel tank and the hydraulic fluid tank which have predetermined capacities. The covers of the boxes are preferably not enlarged and the covers preferably do not jut out at the sides so that the operator is able to see the positions of the left and right crawler belts. Furthermore, the front and rear visibility is also important for a bulldozer operator.

An object of the present invention is to provide a bulldozer with an enough capacity of the reducing agent tank which does not deteriorate the visibility of the operator.

A bulldozer according to a first aspect of the present invention comprises a blade, an engine, a selective catalytic reduction device, a reducing agent tank, and a cab. The engine is disposed behind the blade. The selective catalytic reduction device treats exhaust from the engine. The reducing agent tank stores a reducing agent to used by the selective catalytic reduction device. The cab is disposed behind the engine. The reducing agent tank is disposed on a first side of a lower part of the cab. At least a part of the reducing agent tank overlaps the cab as seen in a top view.

A side surface of the lower part of the cab may slope inwards as seen from the front.

The bulldozer may further comprises a pillar part for a ROPS structure. The pillar part for the ROPS structure may be provided on a rear side of the lower part of the cab. The reducing agent tank may be disposed in front of the pillar part.

The bulldozer may further comprise a battery. The battery may be disposed in front of the pillar part. The reducing agent tank may be disposed in front of the battery.

The bulldozer may further comprise a first housing cover sloping down to the first side, and a supply module for feeding the reducing agent from the reducing agent tank to the selective catalytic reduction device. The reducing agent tank may include a replenishing port tilting toward the first housing cover. The supply module may be disposed between the first housing cover and the reducing agent tank and below the replenishing port.

The reducing agent tank may include a recessed section formed on a first surface facing the first housing cover. The supply module may be disposed in the recessed section.

An upper surface of the supply module may slope down toward the first side.

The bulldozer may include a placing surface for the reducing agent. The supply module may be disposed so as to be spaced upward from the placing surface of the reducing agent tank.

The bulldozer may further comprise a reducing agent tank housing member for housing the reducing agent tank. The supply module may be supported by the reducing agent tank housing member.

The reducing agent tank housing member may include a rubber sheet provided between the supply module and the reducing agent tank.

The placing surface for the reducing agent tank may include an insertion hole through which a filter is inserted from below the supply module or removed when replacing the filter of the supply module. The bulldozer may further comprises an openable cover extending to the insertion hole.

The bulldozer may further comprise a partition wall provided between the reducing agent tank and the battery.

The bulldozer may further comprise a fuel tank, a hydraulic fluid tank, and an engine cooling module. The fuel tank may be disposed on a second side opposite to the first side of the lower part of the cab. The hydraulic fluid tank may be disposed on the first side and at the rear end of the bulldozer. The engine cooling module may be provided between the fuel tank and the hydraulic fluid tank and behind the cab.

Effects of Invention

At least a portion of the reducing agent tank overlaps the cab as seen in a top view in the bulldozer according to the present invention. Therefore, providing a portion of the reducing agent tank in a space to the side of the lower part of the cab enables to increase the capacity of the reducing agent tank without deteriorating visibility for the operator.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
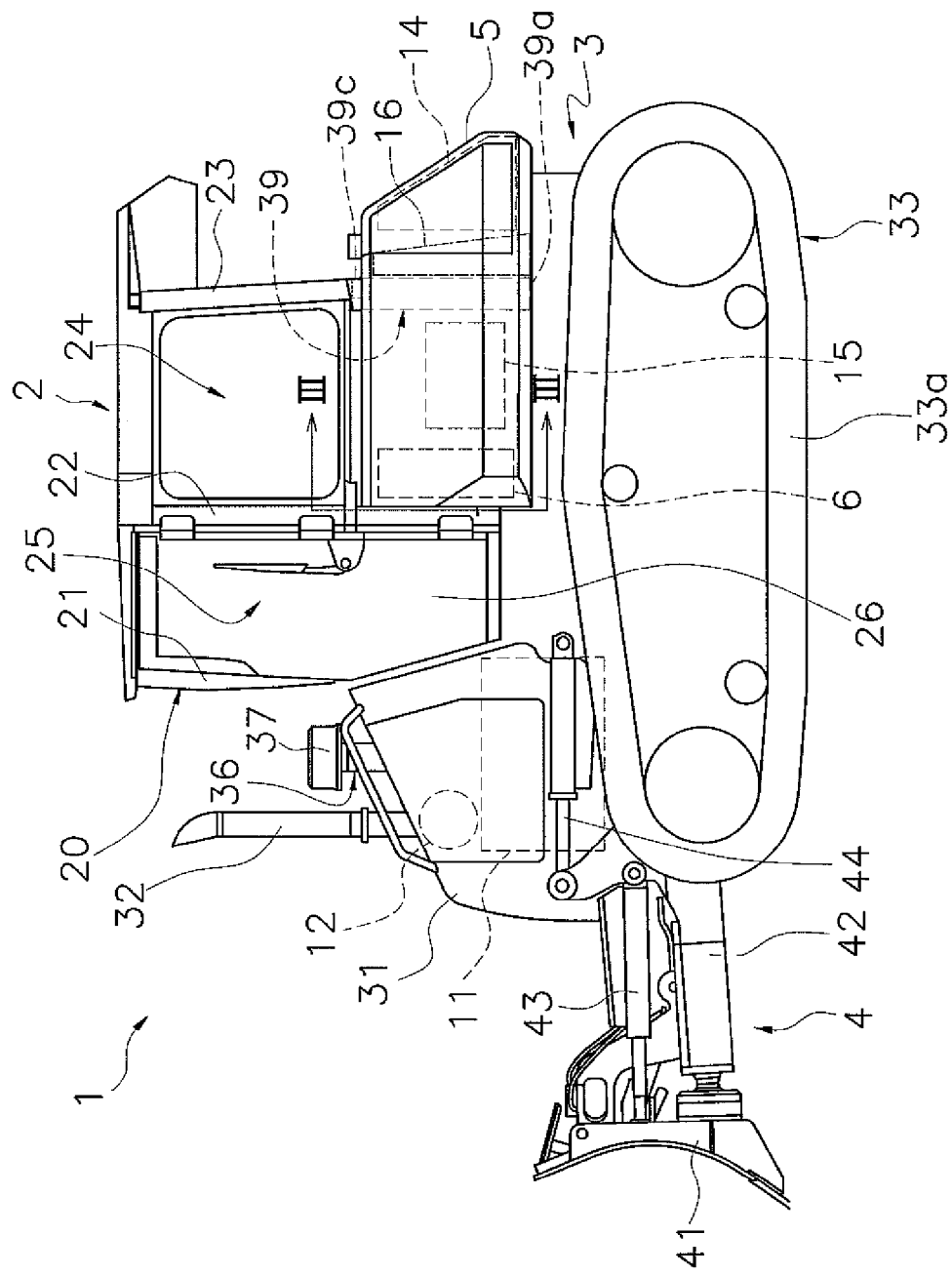
FIG. 1 is a side view of a bulldozer.
Figure 2:
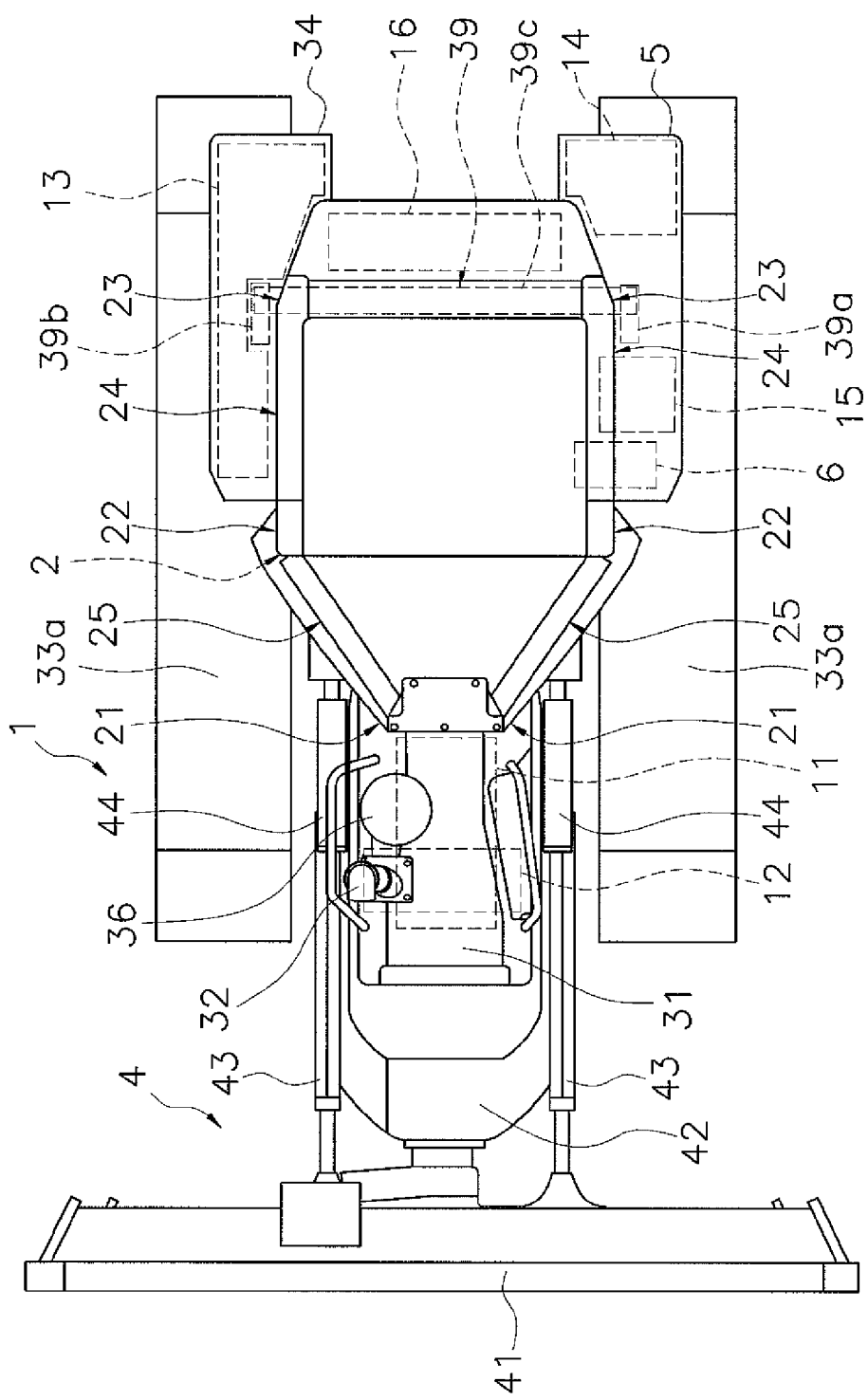
FIG. 2 is a top view of the bulldozer.

A bulldozer 1 according to an embodiment of the present invention is illustrated in FIGS. 1 and 2. FIG. 1 illustrates a side view of the bulldozer 1 and FIG. 2 illustrates a top view of the bulldozer 1. The bulldozer 1 comprises a cab 2, a main vehicle body 3, and a working implement 4. In the following explanation, the front-back direction signifies the front-back direction of the bulldozer 1. In other words, the front-back direction signifies the front-back direction as seen from an operator sitting in the cab 2. Moreover, the left-right direction signifies the left-right direction as seen from an operator sitting in the cab 2. To the side signifies the vehicle lateral direction of the bulldozer 1, that is, in either of the aforementioned left direction or right direction.

(Cab 2)

The cab 2 contains a seat in which the operator of the bulldozer 1 sits, levers for various operations, and pedals and various gauges. The cab 2 has a rollover protective structure (ROPS structure) 39 and is disposed on the main vehicle body 3. The rollover protective structure (ROPS structure) 39 is standardized according to ISO 3471.

The cab 2 has a pair of A pillars 21, a pair of B pillars 22, and a pair of C pillars 23 disposed in order from the front. The pillars 21 to 23 are spaced away from each other in the left-right direction and extend in the vertical direction. The side further to the front of the B pillars 22 is referred to as the front side of the cab 2, and the side further to the rear of the B pillars 22 is referred to as the rear side of the cab 2. The ROPS structure 39 includes a ROPS left pillar part 39a, a ROPS right pillar part 39b, and a ROPS beam part 39c. The ROPS structure 39 is provided on a lower part 2a (see FIG. 3) and at the rear side of the cab 2. The ROPS left pillar part 39a is disposed at the rear side and on the left of the cab 2.

The ROPS right pillar part 39b is disposed at the rear side and on the right of the cab 2. The ROPS beam part 39c is disposed on the upper surfaces of the ROPS left pillar part 39a and the ROPS right pillar part 39b at the rear side of the cab 2. The ROPS beam part 39c extends between the ROPS left pillar part 39a and the ROPS right pillar part 39b. The pair of C pillars 23 are supported by the ROPS beam part 39c. The pair of B pillars 22 and the pair of C pillars 23 are disposed away from each other at approximately the same interval. A pair of rear side surfaces 24 that connect the B pillars 22 and the C pillars 23 are disposed approximately parallel to each other. Conversely, the pair of A pillars 21 are disposed away from each other with an interval that is less than that of the pair of B pillars 22. A pair of front side surfaces 25 that connect the A pillars 21 and the B pillars 22 are disposed so that the interval in the left-right direction decreases further toward the front. The front side surfaces 25 are connected by being inclined toward the front of the cab 2. The cab 2 has a tapered shape in which the width in the left-right direction is smaller at the front surface side. An entrance of the operator is provided in the front side surfaces 25 and has a door 26 attached thereto. A front window 20 which allows the operator inside the cab 2 to be able to see forward is provided in an upper half on the front surface of the cab 2.

(Main Vehicle Body 3)

The main vehicle body 3 includes an engine hood 31, an exhaust pipe 32, left and right travel devices 33, a first housing section 5, a second housing section 34, and a main frame (not illustrated) for supporting the aforementioned members.

The engine hood 31 is provided in front of the cab 2. The upper surface of the engine hood 31 slopes down to the front. The rear edge section of the upper surface of the engine hood 31 is connected to the bottom end of the front window 20 of the cab 2. An opening through which an air intake port of an air cleaner 36 and the exhaust pipe 32 penetrate is provided in the upper surface of the engine hood 31.

The main vehicle body 3 includes an engine 11 and a selective catalytic reduction device 12 inside the engine hood 31. The cab 2 is disposed behind the engine 11. That is, the engine 11 and the selective catalytic reduction device 12 are disposed inside the engine hood 31. The engine 11 is, for example, a diesel engine and generates driving power for driving the travel devices 33 and working implement pumps (not illustrated) and the like. The selective catalytic reduction device 12 treats exhaust from the engine 11 with a reducing agent. The selective catalytic reduction device 12 selectively reduces nitrogen oxides NOx. The reducing agent is, for example, aqueous urea in the present embodiment. When the reducing agent is aqueous urea, the aforementioned selective catalytic reduction device 12 includes a pipe for injecting the aqueous urea into the exhaust gas to initiate hydrolysis in the exhaust gas to obtain ammonia gas.

The exhaust pipe 32 is a pipe for discharging into outside, the exhaust gas that has been treated by the selective catalytic reduction device 12 from the engine 11. The exhaust pipe 32 is provided so as to protrude upward from the upper surface of the engine hood 31. The upper end of the exhaust pipe 32 extends upward to about a height of the upper surface of the cab 2. The exhaust pipe 32 is provided eccentrically toward one side from the center in the left-right direction of the engine hood 31. The exhaust pipe 32 is provided in a standing manner at a position in line with the right side A pillar among the pair of A pillars 21 as seen from the rear, that is, as seen from the operator inside the cab 2. As a result, deterioration of the forward visibility of the operator inside the cab 2 due to the exhaust pipe 32 is prevented. A head section 37 of the air cleaner 36 is disposed behind the exhaust pipe 32.

The travel devices 33 are attached on the left and right sides of the main frame. The travel devices 33 have a crawler belt 33a. The bulldozer 1 travels due to the rotation of the crawler belts 33a which are wrapped onto the top and bottom of a plurality of wheels.

The first housing section 5 is attached to a first side at the lower part 2a (see FIG. 3) of the cab 2. While FIGS. 1 and 2 depict the left side as the first side, the first side may be the right side. The main vehicle body 3 includes a reducing agent tank module 6, a battery 15, and a hydraulic fluid tank 14 inside the first housing section 5. That is, the reducing agent tank module 6, the battery 15, and the hydraulic fluid tank 14 are stored in the first housing section 5. That is, the reducing agent tank module 6 is disposed on the first side of the lower part 2a (see FIG. 3) of the cab 2. The hydraulic fluid tank 14 stores hydraulic fluid to be supplied to a gear system and to a working implement 4 system. The hydraulic fluid tank 14 is provided at the rear end of the first housing section 5. That is, the hydraulic fluid tank 14 is disposed on the first side and at the rear end of the bulldozer 1. The reducing agent tank module 6 includes a reducing agent tank 60 (see FIG. 4 etc.), which is described hereinafter. The reducing agent tank 60 stores reducing agent to be used by the selective catalytic reduction device 12. The reducing agent is supplied to the selective catalytic reduction device 12. The battery 15 is used as an electric power source for starting the engine 11 and illumination. The first housing section 5 further houses the ROPS left pillar part 39a.

The second housing section 34 is attached to a second side that is on the opposite side of the first side of the lower part 2a (see FIG. 3) of the cab 2. The main vehicle body 3 includes a fuel tank 13 inside the second housing section 34. That is, the fuel tank 13 is stored in the second housing section 34. In other words, the fuel tank 13 is disposed on the second side of the lower part 2a (see FIG. 3) of the cab 2. The fuel tank 13 stores fuel to be supplied to the engine 11. The second housing section 34 further houses the ROPS right pillar part 39b.

The main vehicle body 3 includes an engine cooling module 16 behind the ROPS structure 39. Specifically, the engine cooling module 16 is provided between the left and right first housing section 5 and the second housing section 34 and behind the cab 2. In other words, the engine cooling module 16 is provided between the fuel tank 13 and the hydraulic fluid tank 14 and behind the cab 2. The engine cooling module 16 is disposed forward of rear ends of a cover of the first housing section 5 and a cover of the second housing section 34. Consequently, the engine cooling module 16 is protected from external obstacles and it is easy to check the state of work to the rear by looking to the rear from the cab 2 over the engine cooling module 16. As a result, when a ripper or winch is attached to the rear section of the bulldozer 1, it is possible to operate the work by checking the rear working implement from the cab 2 over the engine cooling module 16.

The engine cooling module 16 includes, for example, a radiator, a fan, and a motor. The engine cooling module 16 causes the motor to rotate the fan and cools the coolant flowing in the radiator to cool the engine 11.

(Working Implement 4)

The working implement 4 includes a blade 41, an arm member 42, and hydraulic cylinders 43 and 44. The blade 41 is provided in front of the engine hood 31. The engine 11 is disposed behind the blade 41. The blade 41 has a width that is greater than that of the cab 2 in the left-right direction. When the lower end section of the blade 41 is in contact with the ground, the upper end section of the blade 41 is positioned below the upper surface of the engine hood 31, and the upper surface of the engine hood 31 is positioned below a virtual line that connects the upper end section of the blade 41 and a view point of the operator sitting the seat inside the cab 2. The arm member 42 supports the working implement 4. One end of the arm member 42 is connected to the main vehicle body 3 and the other end of the arm member 42 is connected to the blade 41. The hydraulic cylinders 43 and 44 are hydraulic actuators for moving and tilting the blade 41 in a desired direction by extending and collapsing.

(Detailed Structure of First Housing Section 5)

Figure 3:
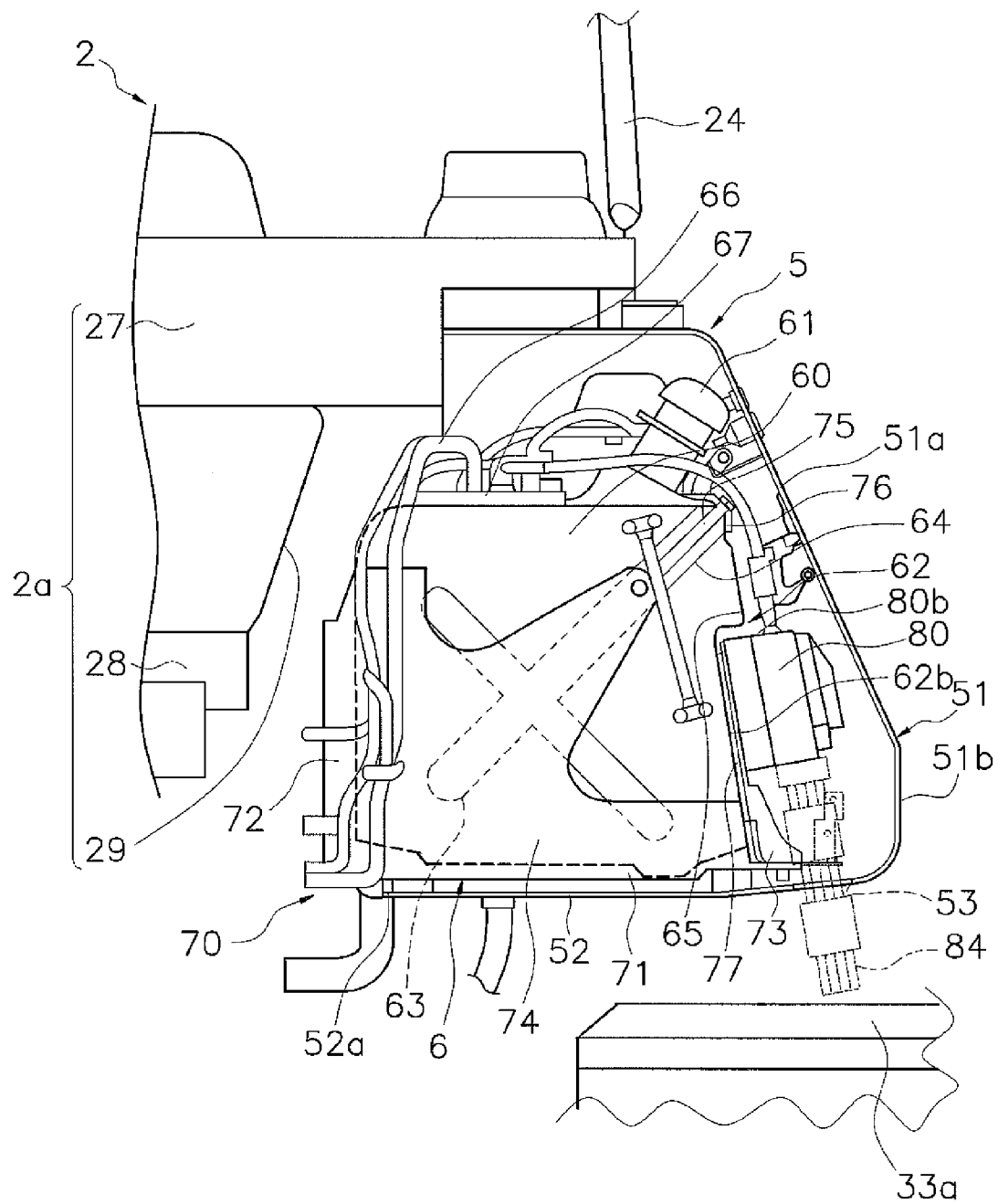
FIG. 3 is a cross-sectional view as seen from a cross-sectional line III-III in FIG. 1 of a first embodiment.

According to FIG. 3, the lower part 2a of the cab 2 includes an attachment part 27, a floor section 28, and a floor supporting section 29. The lower part 2a of the cab 2 refers to a portion of the cab 2 below the bottom edges of the rear side surfaces 24. The attachment part 27 has an upper surface corresponding to the height of the elbow of the operator while the operator is sitting. An operating lever and the like is attached to the attachment part 27. The floor section 28 corresponds to the floor on which the operator places his or her feet. The floor supporting section 29 connects the attachment part 27 and the floor section 28. The floor supporting section 29 slopes down inwardly as seen from the front. That is, the side surfaces of the lower part 2a of the cab 2 slope down inwardly as seen from the front.

The first housing section 5 is connected to the lower part of the attachment part 27. The first housing section 5 is disposed on the first side of the lower part 2a of the cab 2. By the way, because the second housing section 34 is disposed in a position having left/right symmetry with the first housing section 5, the second housing section 34 is disposed on the second side of the lower part 2a of the cab 2. As can be seen in FIG. 3, at least a portion of the first housing section 5 overlaps the cab 2 as seen in a top view. The first housing section 5 is supported from below by the main frame which is not illustrated. The first housing section 5 includes a first housing cover 51 and a bottom surface 52. The first housing cover 51 slopes down toward the first side. The first housing cover 51 includes an upper openable cover 51a and a lower openable cover 51b. The bottom surface 52 includes an insertion hole 53.

Figure 4:
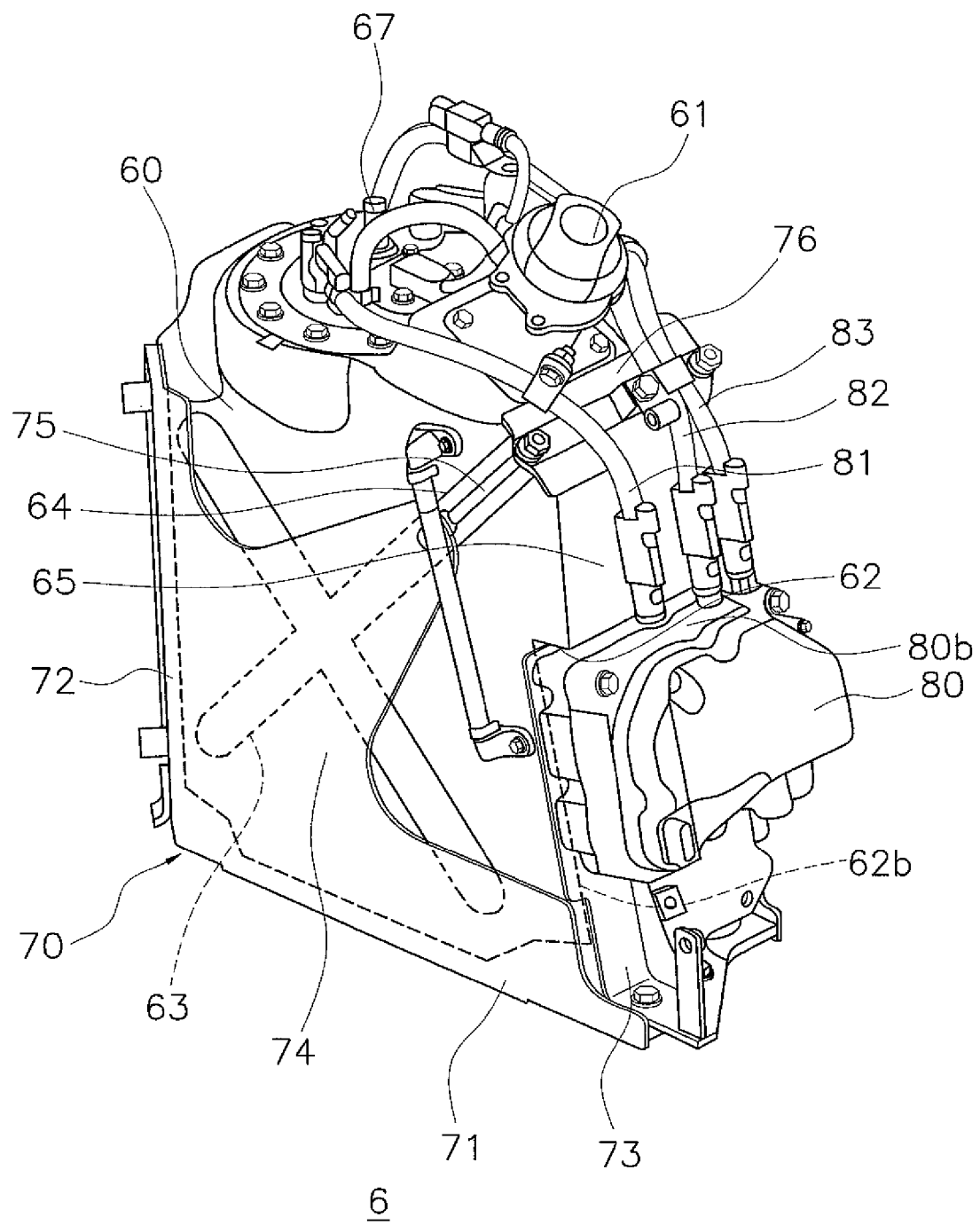
FIG. 4 is an enlarged perspective view of a reducing agent tank module according to the first embodiment.

According to FIGS. 3 and 4, the reducing agent tank module 6 stored in the first housing section 5 includes the reducing agent tank 60, a reducing agent tank housing member 70, and a supply module 80. That is, the reducing agent tank 60 is stored in the first housing section 5. The reducing agent tank 60 is disposed on the bottom surface 52 of the first housing section 5. That is, the bottom surface 52 of the first housing section 5 is a placing surface for placing the reducing agent tank 60. The contour of the reducing agent tank 60 hidden by the reducing agent tank housing member 70 is depicted by a dotted line in FIGS. 3 and 4. According to this, the reducing agent tank 60 has a substantially rectangular pillar shape. At least a part of the reducing agent tank 60 overlaps the cab 2 as seen in a top view.

The reducing agent tank 60 includes a replenishing port 61 on the upper surface thereof which extends diagonally upward. The replenishing port 61 tilts toward the first housing cover 51. The reducing agent tank 60 includes a first surface 65 and a recessed section 62 formed below the first surface 65. The first surface 65 faces the first housing cover 51 and slopes down toward the first side. The recessed section 62 is recessed from the first surface 65 toward the second side. The recessed section 62 includes an attachment surface 62b for attaching the supply module 80. The attachment surface 62b slopes down toward the first side. A portion of the recessed section 62 except for the attachment surface 62b can be used as a handle for removing the reducing agent tank 60.

A groove 63 having an approximate X-shape is provided on the reducing agent tank 60 on a side surface in the front-back direction of the vehicle. That is, the reducing agent tank 60 includes the groove 63. As a result, the strength of the side surface of the reducing agent tank 60 is increased. Moreover, a groove 64 in an upward and first side corner of the groove 63 extends to the first surface 65. The reducing agent tank 60 is firmly fixed to the reducing agent tank housing member 70 by hitching a locking component 75 for the reducing agent tank housing member 70 on the groove 64 and fastening the locking component 75 to an upper locking member 76 of the reducing agent tank housing member 70.

A heat exchanger 67 connected to a hot water pipe 66 for preventing freezing of the reducing agent, is connected to an upper surface of the reducing agent tank 60. A portion of the cooling water heated by the engine 11, for example, flows through the hot water pipe 66. That is, the reducing agent tank 60 includes the heat exchanger 67. The heat exchanger 67 has a pipe that is bent into an L-shape in the reducing agent tank 60, and the reducing agent inside the reducing agent tank 60 is heated due to hot water from the hot water pipe 66 flowing through the pipe. The hot water pipe 66 is not illustrated in FIG. 4.

The reducing agent tank housing member 70 houses the reducing agent tank 60. The reducing agent tank housing member 70 includes a bottom part 71, an internal fixing part 72, an external fixing part 73, a side surface fixing part 74, the locking component 75, and the upper locking member 76. The bottom part 71 is fixed to the bottom surface 52 of the first housing section 5 by using a bolt and the like. The internal fixing part 72 is formed integrally with the bottom part 71. Alternatively, the internal fixing part 72 is welded to the bottom part 71. The internal fixing part 72 extends upward form the bottom part 71. The internal fixing part 72 is positioned to the second side from an end part 52a on the second side of the bottom surface 52 of the first housing section 5. A gap for inserting various pipes is provided between the internal fixing part 72 and the floor supporting section 29. The external fixing part 73 extends upward toward the second side from the bottom part 71. The external fixing part 73 extends along the surface of the recessed section 62. The external fixing part 73 is fixed in a removable manner to the bottom part 71 with a bolt and the like. The side surface fixing part 74 extends from the bottom part 71 and the internal fixing part 72 upward and toward the first side. The aforementioned locking component 75 is attached to the side surface fixing part 74, and the reducing agent tank 60 is fixed by fixing the upper locking member 76 to the locking component 75 with a bolt and the like.

The supply module 80 is a pump for feeding the reducing agent from the reducing agent tank 60 to the selective catalytic reduction device 12. As illustrated in FIG. 4, a first pipe 81, a second pipe 82, and a third pipe 83 are connected to the supply module 80. More specifically, the first pipe 81, the second pipe 82, and the third pipe 83 are connected to an upper surface 80b of the supply module 80. The first pipe 81 is a pipe for sucking up the reducing agent from the reducing agent tank 60. The second pipe 82 is a pipe for returning the reducing agent sucked up by the supply module 80 to the reducing agent tank 60 when the engine 11 has stopped. The third pipe 83 is a pipe for feeding the reducing agent to the selective catalytic reduction device 12. The pipes are wound by Nichrome wires. Freezing of the reducing agent is prevented by applying an electrical current through the Nichrome wires to heat the reducing agent.

The first pipe 81, the second pipe 82, and the third pipe 83 are disposed so as to extend linearly a certain distance from the upper surface 80b of the supply module 80. The supply module 80 is disposed on the attachment surface 62b formed below the first surface 65. A gap in the direction perpendicular to the attachment surface 62b between the attachment surface 62b and the first pipe 81, the second pipe 82, and the third pipe 83 is greater than a gap in the direction perpendicular to the attachment surface 62b between the attachment surface 62b and the first surface 65. It is difficult to bend the first pipe 81, the second pipe 82, and the third pipe 83, because they are wound by the Nichrome wire. However, the curvature of the first pipe 81, the second pipe 82, and the third pipe 83 can be reduced when they are installed, which facilitates the installation.

A filter 84 in the supply module 80 needs to be replaced periodically. The filter 84 can be removed and inserted from below the supply module 80 as illustrated by the chain double-dashed line in FIG. 3. In order to facilitate the filter replacement, the insertion hole 53 in the first housing section 5 allows the insertion of the filter 84 that is removed or inserted from below the supply module 80.

Moreover, the supply module 80 is disposed so as to be spaced upward from the bottom surface 52 of the first housing section 5 to facilitate the replacement of the filter 84. Consequently, the filter 84 is not blocked by the crawler belt 33a when replacing the filter 84 of the supply module 80. Therefore, the filter replacement of the supply module 80 can be performed without removing the supply module 80 from the reducing agent tank housing member 70. Thus, maintenance of the supply module is facilitated.

In order to space the supply module 80 upward from the bottom surface 52 of the first housing section 5, the supply module 80 is supported by the reducing agent tank housing member 70. That is, the supply module 80 is attached to the reducing agent tank housing member 70. Specifically, the supply module 80 is attached by a bolt and the like to the external fixing part 73. As a result, the supply module 80 and the reducing agent tank 60 can be disposed in proximity to each other thus allowing the lengths of the first pipe 81 and the second pipe 82 to be reduced. Therefore, the maintenance of the reducing agent tank module 6 is further facilitated.

Figure 5:
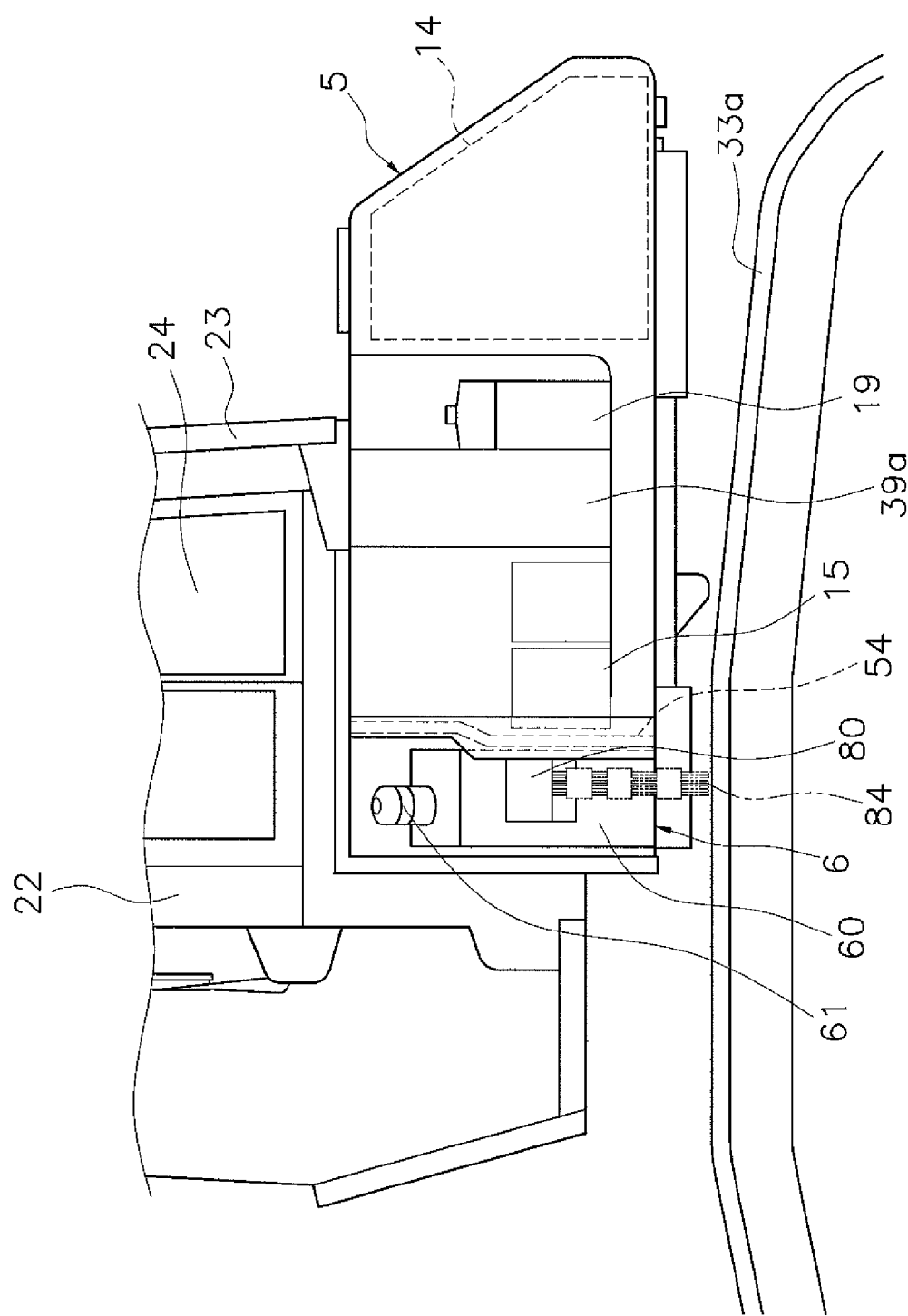
FIG. 5 is a side view of a first housing section when the first housing cover and another cover are removed according to the first embodiment.
Figure 6:
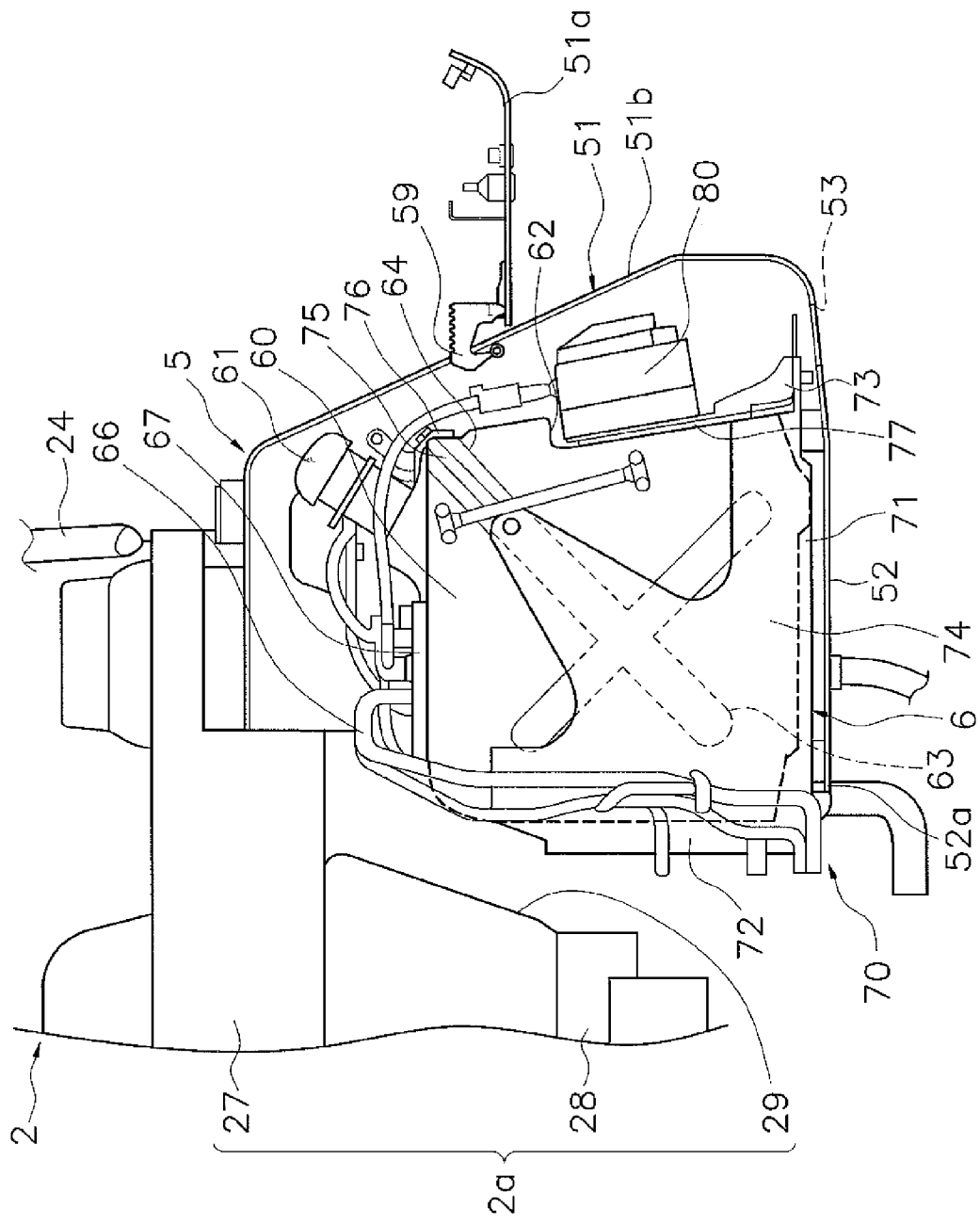
FIG. 6 is a cross-sectional view as seen from cross-sectional line III-III in FIG. 1 when only an upper openable cover is opened in the first housing cover according to the first embodiment.

The supply module 80 may be disposed between the first housing cover 51 and the reducing agent tank 60 and below the replenishing port 61 as illustrated in FIG. 3. The first housing cover 51 of the first housing section 5 extends to the insertion hole 53. Therefore, as illustrated in FIG. 5, when the first housing cover 51 is removed, all of the replenishing port 61 of the reducing agent tank 60, the supply module 80, and the filters of the supply module 80 can be accessed. The first housing cover 51 includes the upper openable cover 51a that allows access to the replenishing port 61 from outside of the first housing section 5, and the lower openable cover 51b that allows access to the supply module 80 from outside of the first housing section 5. As illustrated in FIG. 6, the upper openable cover 51a can be opened with a hinge 59 having a rotational axis extending in the front-back direction of the vehicle. Therefore, by opening only the upper openable cover 51a of the first housing cover 51, the reducing agent can be poured into the reducing agent tank 60. As a result, maintenance for pouring the reducing agent into the reducing agent tank 60 is facilitated.

The reducing agent tank housing member 70 may include a rubber sheet 77 provided between the supply module 80 and the reducing agent tank 60 as illustrated in FIGS. 3 and 6. As a result, the reducing agent tank 60 can be pressed against the reducing agent tank housing member 70, thereby the reducing agent tank 60 is fixed firmly to the reducing agent tank housing member 70.

The disposition of the remaining members of the first housing section 5 will be described next. As illustrated in FIG. 5, tanks 19 such as a reserve tank (a tank in which engine cooling water is stored) are disposed in front of the hydraulic fluid tank 14 and behind the ROPS left pillar part 39a. A battery 15 is disposed inside the first housing section 5 and in front of the ROPS left pillar part 39a. The reducing agent tank module 6 (reducing agent tank 60) is disposed in front of the battery 15. That is, the reducing agent tank module 6 (reducing agent tank 60) is disposed in front of the ROPS left pillar part 39a. A partition wall 54 is provided between the reducing agent tank module 6 (reducing agent tank 60) and the battery 15. Consequently, heat generated at the rear of the first housing section 5 is not transmitted easily to the reducing agent tank 60.

Second Embodiment

Next a bulldozer 1a according to a second embodiment of the present invention will be discussed. The bulldozer 1a is mostly the same as the bulldozer 1 of the first embodiment except for the first housing section and the reducing agent tank module. Therefore, the first housing section of the second embodiment will be referred to as a first housing section 5a, the reducing agent tank module will be referred to as a reducing agent tank module 6a, and the explanation will focus on the differences from the first embodiment. Configurations that are the same as in the first embodiment will be provided with the same reference numerals as the first embodiment and detailed explanations thereof will be omitted.

Figure 7:
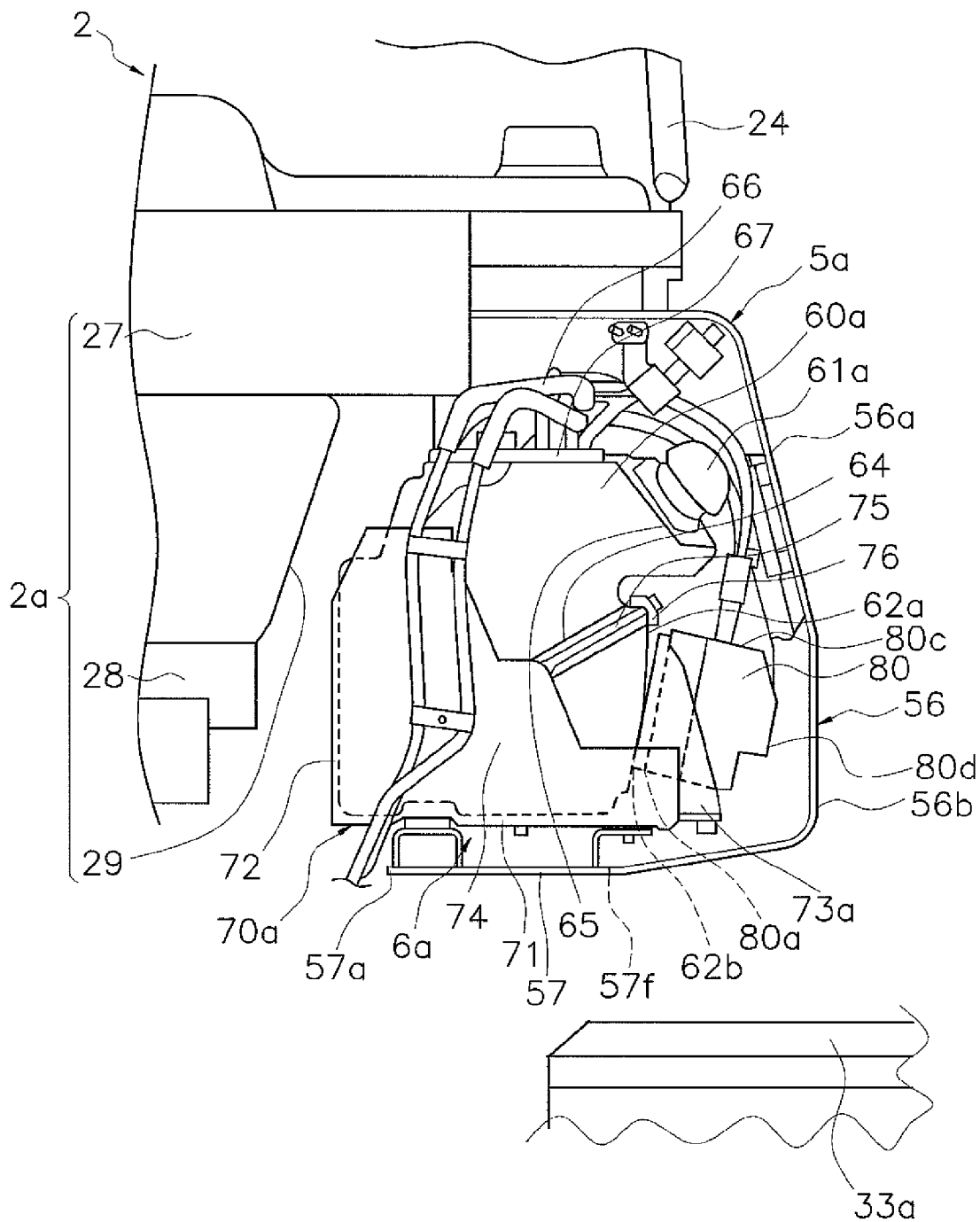
FIG. 7 is a cross-sectional view as seen from cross-sectional line III-III in FIG. 1 according to the second embodiment.

According to FIG. 7, the first housing section 5a includes a first housing cover 56 and a bottom surface 57 that differ from the first housing cover 51 and the bottom surface 52 of the first embodiment. The first housing cover 56 slopes down toward the first side but slopes more steeply downward than the first housing cover 51. The first housing cover 56 includes an upper openable cover 56a and a lower openable cover 56b. The bottom surface 57 does not include an insertion hole, and the lower openable cover 56b extends to a position 57f of the bottom surface 57 in the proximity of the center position in the left-right direction of the first housing section 5a. In other words, the lower openable cover 56b extends to the position 57f of the bottom surface 57 that is positioned to the second side from an end part 80a on the second side of the supply module 80. An upper surface 80c of the supply module 80 slopes down toward the first side. In other words, a surface 80d in the first side (the left) of the supply module 80 is inclined downward and toward the second side (the right). Therefore, the first housing cover 56 slopes more steeply than the first housing cover 51 of the first embodiment, and thus the visibility of the operator to the side is further improved.

Figure 8:
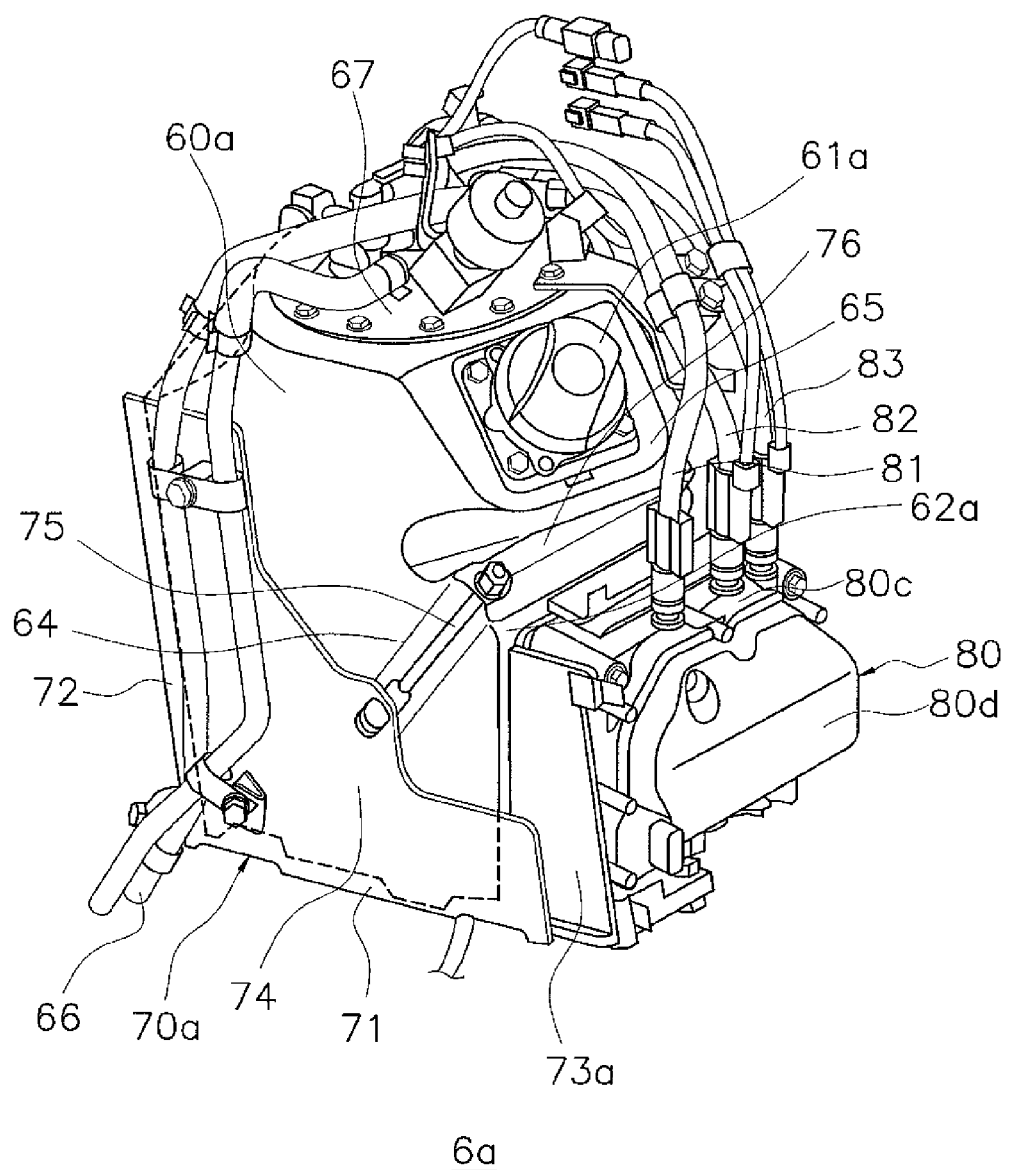
FIG. 8 is an enlarged perspective view of the reducing agent tank module according to the second embodiment.

When referring to FIGS. 7 and 8, the reducing agent tank module 6a includes a reducing agent tank 60a, a reducing agent tank housing member 70a, and a supply module 80a. At least a part of the reducing agent tank 60a overlaps the cab 2 as seen in a top view in the second embodiment. The contour of the reducing agent tank 60a hidden by the reducing agent tank housing member 70a is depicted by dotted lines in FIGS. 7 and 8. According to this, the reducing agent tank 60a includes the first surface 65 which faces the first housing cover 56 and which slopes down toward the first side, and a replenishing port 61a that extends upward diagonally on the first surface 65. According to FIGS. 8 and 9, the replenishing port 61a is positioned nearer to the front than the center position of the reducing agent tank 60a in the front-back direction of the vehicle. That is, the replenishing port 61a is shifted from the center toward the front. The reducing agent tank 60a includes a recessed section 62a that is recessed from the first surface 65 toward the second side. The principle surface of the recessed section 62a is inclined downward and toward the second side. Therefore, the upper surface 80c of the supply module 80 disposed in the recessed section 62a slopes down toward the first side. As a result, access is facilitated to the attachment part of the first pipe 81, the attachment part of the second pipe 82, and the attachment part of the third pipe 83. The groove 64 is formed in an upward and first side corner on the side surface of the reducing agent tank 60 in the front-back direction of the vehicle. The groove 64 has a linear shape.

The reducing agent tank housing member 70a houses the reducing agent tank 60a. The reducing agent tank housing member 70a includes the bottom part 71, the internal fixing part 72, an external fixing part 73a, the side surface fixing part 74, the locking component 75, and the upper locking member 76. The bottom part 71 is fixed to the bottom surface 57 of the first housing section 5a by using a bolt and the like. The internal fixing part 72 is positioned to the second side from an end part 57a on the second side of the bottom surface 57 of the first housing section 5a. The external fixing part 73a extends upward and toward the first side from a bottom part 71 along the surface of the recessed section 62a.

According to FIG. 8, the first pipe 81, the second pipe 82, and the third pipe 83 that are connected to the supply module 80 are disposed so as to pass to the rear of the replenishing port 61a in the vehicle front-back direction. While it is difficult to bend the first pipe 81, the second pipe 82, and the third pipe 83, because they are wound by the Nichrome, as described above, the curvature of the first pipe 81, the second pipe 82, and the third pipe 83 can be reduced when they are installed, which facilitates the installation.

Figure 9:
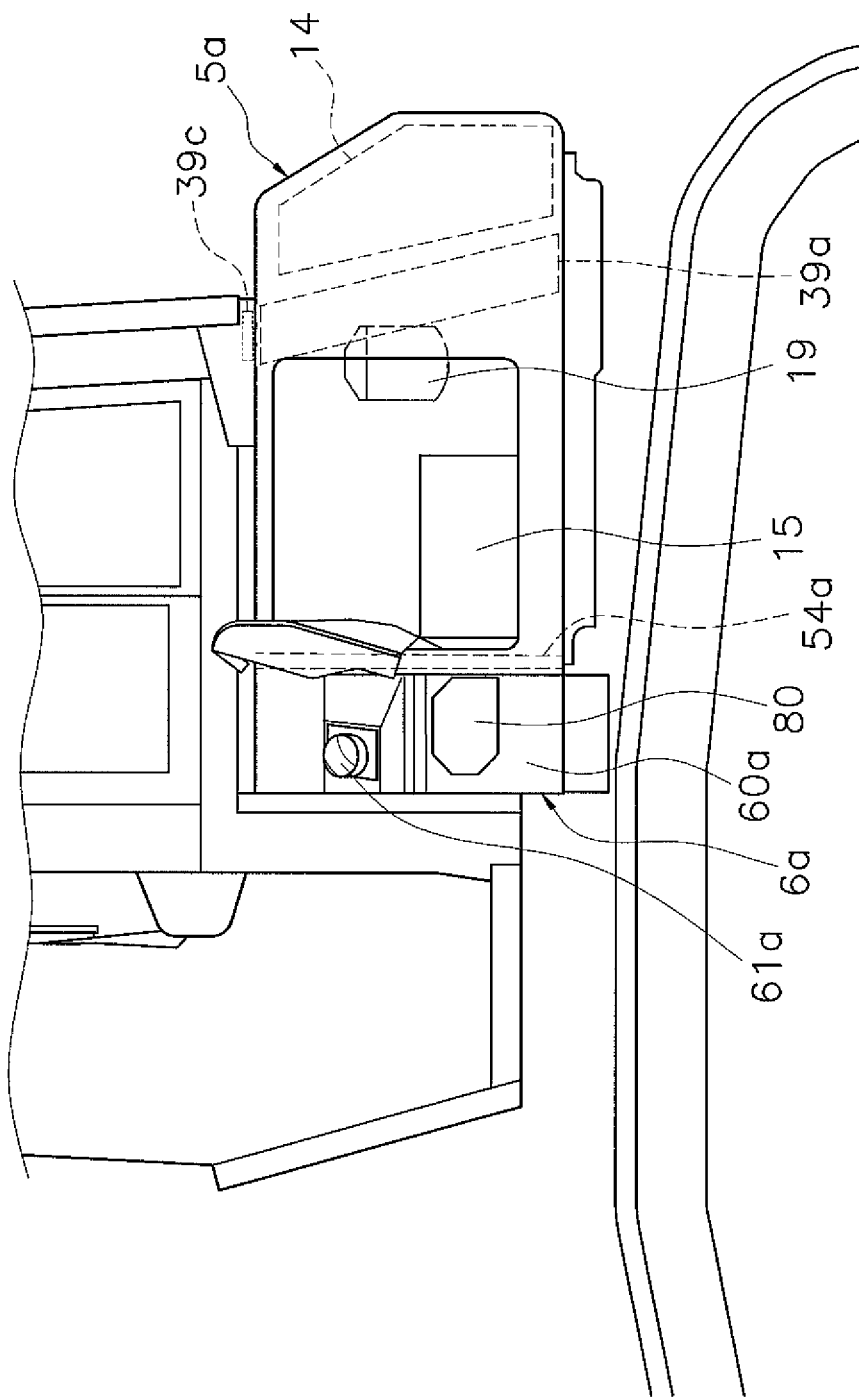
FIG. 9 is a side view of the first housing section when the first housing cover and another cover are removed according to the second embodiment.
Figure 10:
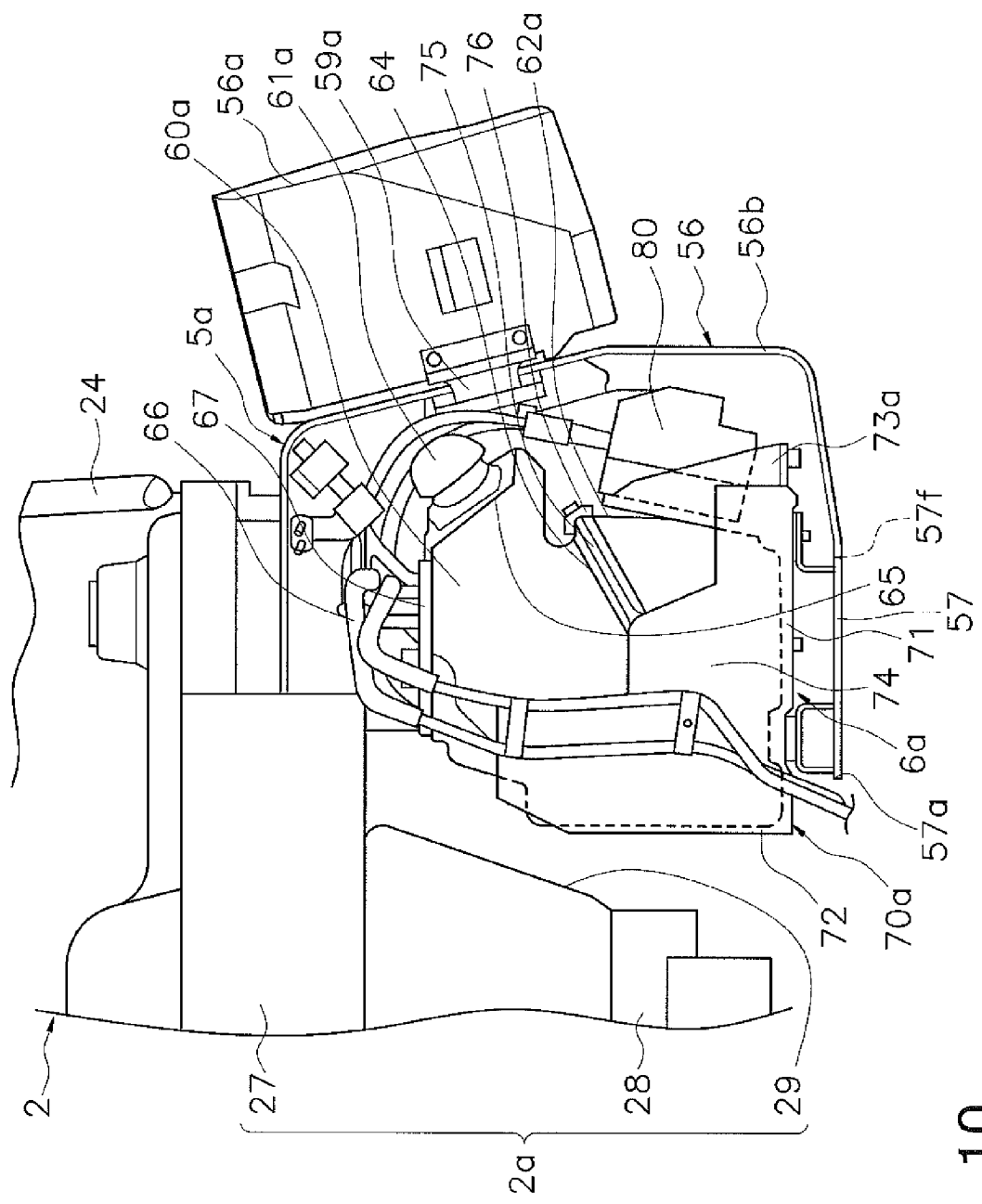
FIG. 10 is a cross-sectional view as seen from the cross-sectional line III-III in FIG. 1 when only the upper openable cover is opened in the first housing cover according to the second embodiment.

As illustrated in FIG. 7, the supply module 80 is disposed between the first housing cover 51a and the reducing agent tank 60a and below the replenishing port 61a. The first housing cover 56 of the first housing section 5a extends to the position 57f of the bottom surface 57 in the proximity of the center position in the left-right direction of the first housing section 5a. Therefore, as illustrated in FIG. 9, when the first housing cover 51 is removed, all of the replenishing port 61a of the reducing agent tank 60a and the supply module 80 can be accessed. When the first housing cover 56 is removed, the filter of the supply module 80 can be replaced since the bottom surface 57 does not cover a lower region below the supply module 80. The first housing cover 56 includes the upper openable cover 56a that allows access to the replenishing port 61a from outside of the first housing section 5a, and the lower openable cover 56b that allows access to the supply module 80 from outside of the first housing section 5a. As illustrated in FIG. 10, the upper openable cover 56a can be opened with a hinge 59a having a rotational axis extending in the vertical direction. Therefore, by opening only the upper openable cover 56a of the first housing cover 56, the reducing agent can be poured into the reducing agent tank 60. As a result, maintenance for pouring the reducing agent into the reducing agent tank 60 is facilitated.

The disposition of the remaining members of the first housing section 5a will be described next. According to FIG. 9, while the orientation of the battery 15, the shape of a partition wall 54a, and the shape of the ROPS left pillar part 39a are changed slightly in accordance with the changes of the reducing agent tank module 6a and the first housing cover 56, the other members of the first housing section 5a are not so different from the members in the first embodiment.

(Features)

The bulldozers 1 and 1a according to the present embodiments have the following features.

(1) At least a part of the reducing agent tank 60 or 60a overlaps the cab 2 as seen in a top view in the bulldozers 1 or 1a. Therefore, the capacity of the reducing agent tank 60 or 60a can be increased due to the provision of a part of the reducing agent tank 60 or 60a in a space on the side of the lower part of the cab 2. Therefore, it is possible to increase the capacity of the reducing agent tank 60 or 60a with sufficiently assuring visibility by the operator to the side.

(2) The side surfaces of the lower part of the cab 2 slopes inwardly as seen from the front. As a result, the capacity of the reducing agent tank 60 or 60a can be increased further.

(3) The reducing agent tank 60 or 60a is disposed in front of the pillar part 39a of the ROPS structure 39. Therefore, the reducing agent 60 or 60a is disposed in a narrow location. Therefore, the method of the embodiment is effective for disposing the reducing agent tank 60 or 60a so that at least a part of the reducing agent tank 60 or 60a overlaps the cab 2 as seen in a top view.

(4) The reducing agent tank 60 or 60a is disposed further in front of the battery 15, which is disposed in front of the pillar part 39a of the ROPS structure 39. Therefore, the reducing agent tank 60 or 60a is disposed in a narrow location. Therefore, the method of the embodiment is more effective for disposing the reducing agent tank 60 or 60a so that at least a part of the reducing agent tank 60 or 60a overlaps the cab 2 as seen in a top view.

(5) The bulldozer 1 or 1a includes the first housing cover 51 or 56 that slopes down toward the first side. The reducing agent tank 60 or 60a includes the replenishing port 61 or 61a that tilts toward the first housing cover 51 or 56. The supply module 80 is disposed between the first housing cover 51 or 56 and the reducing agent tank 60 or 60a and below the replenishing port 60 or 61a. Therefore, when the first housing cover 51 or 56 is removed, the replenishing port 61 or 61a of the reducing agent tank 60 or 60a, the supply module 80, and the filter of the supply module 80 can all be accessed. Because the supply module 80 is disposed in the proximity to the lower end of the first housing cover 51 or 56, the first housing cover 51 or 56 does not need to protrude laterally, thereby visibility to the side can be improved.

(6) The reducing agent tank 60 or 60a includes the recessed section 62 or 62a formed in the first surface 65 facing the first housing cover 51 or 56. The supply module 80 is disposed in the recessed section 62 or 62a. As a result, the supply module 80 is disposed without protruding toward the first side. Therefore, visibility to the side is further improved in the bulldozer 1 or 1a.

(7) The upper surface 80c of the supply module 80 slopes down toward the first side. Consequently, visibility by the operator to the side is further improved since the first housing cover 56 is further inclined downward.

(8) The supply module 80 is disposed so as to be spaced upward from the placing surface 52 or 57 of the reducing agent tank 60 or 60a. Consequently, the filter 84 of the supply module 80 is not blocked by the crawler belt 33a when replacing the filter 84. Therefore, the filter replacement of the supply module 80 can be performed without removing the supply module 80 from the reducing agent tank housing member 70 or 70a. Thus maintenance of the supply module is facilitated.

(9) The supply module 80 is supported by the reducing agent tank housing member 70 or 70a. Consequently, the reducing agent tank module 6 or 6a can be compactly formed.

(10) The reducing agent tank housing member 70 includes the rubber sheet 77 provided between the supply module 80 and the reducing agent tank 60. As a result, the reducing agent tank 60 can be pressed against the reducing agent tank housing member 70, thereby the reducing agent tank 60 is fixed firmly to the reducing agent tank housing member 70.

(11) The bottom surface 52 of the first housing section 5 includes the insertion hole 53 for allowing the insertion of the filter 84 that is removed or inserted from below the supply module 80 in order to replace the filter 84 of the supply module 80. The first housing cover 51 includes the openable cover 51a or 51b that extends to the insertion hole. Consequently, the replacement of the filter 84 in the supply module 80 is facilitated.

(12) The bulldozer 1 or 1a includes the partition wall 54 or 54a provided between the reducing agent tank 60 or 60a and the battery 15. Consequently, heat that is generated in the portion behind the reducing agent tank 60 or 60a is not easily transmitted to the reducing agent tank 60 or 60a.

(13) The bulldozer 1 or 1a further comprises the fuel tank 13, the hydraulic fluid tank 14, and the engine cooling module 16. The fuel tank 13 is disposed on the second side opposite to the first side of the lower part of the cab 2. The hydraulic fluid tank 14 is disposed on the first side and at the rear end of the bulldozer 1 or 1a. The engine cooling module 16 is provided between the fuel tank 13 and the hydraulic fluid tank 14 and behind the cab 2. Therefore, there is no other space than the narrow space to dispose the reducing agent tank 60 or 60a. Therefore, the method of the embodiment is very effective for disposing the reducing agent tank 60 or 60a so that at least a part of the reducing agent tank 60 or 60a overlaps the cab 2 as seen in a top view.

Modified Examples

Although embodiments of the present invention have been described so far, the present invention is not limited to the above embodiments and various modifications may be made within the scope of the invention.

The shapes of the first housing sections 5 and 5a, the second housing section 34, the fuel tank 13, the hydraulic fluid tank 14, the battery 15, the first housing covers 51 and 56, the reducing agent tanks 60 and 60a, the reducing agent tank housing members 70 and 70a, and the partition walls 54 and 54a are not limited to the shapes of the above embodiments and may have different shapes.

The positions of the battery 15 and the hydraulic fluid tank 14 may be switched. The positions of the battery 15 and the reducing agent tank modules 6 and 6a may be switched. The hydraulic fluid tank 14 or the battery 15 may be stored in the second housing section 34 or in another location. The rubber sheet 77 may be omitted.

INDUSTRIAL APPLICABILITY

The present invention is able to provide a bulldozer that is able to sufficiently assure the capacity of a reducing agent tank without deteriorating visibility for the operator.

The invention claimed is:

1. A reducing agent tank module comprising:
a reducing agent tank including a first lateral surface and a recessed section formed below the first lateral surface; the recessed section of the reducing agent tank having a recessed depth; and
a supply module having a supply module depth wherein the supply module depth is greater than that of the recessed depth;
a portion of an upper face of the supply module extends past an outer section of the recessed section; and
a pipe is in communication with the portion of the upper face of the supply module.

2. The reducing agent tank module according to claim 1, further comprising:
the supply module including a pump for discharging a reducing agent from the reducing agent tank, wherein the supply module is at least partially disposed in the recessed section.

3. The reducing agent tank module according to claim 1, wherein the reducing agent tank includes a replenishing port provided on the first lateral surface.

4. The reducing agent tank module according to claim 1, the reducing agent tank further includes a second lateral surface opposite the first lateral surface, wherein
the reducing agent tank includes an upper surface positioned above the first lateral surface and a replenishing port provided on the upper surface nearer to the first lateral surface than the second lateral surface.

5. The reducing agent tank module according to claim 3, wherein the replenishing port tilts upward.

6. The reducing agent tank module according to claim 4, wherein the replenishing port tilts upward and toward a first lateral direction.

7. The reducing agent tank module according to claim 2, further comprising a filter disposed below the supply module.

8. The reducing agent tank module according to claim 2, further comprising a reducing agent tank housing member supporting the supply module.

9. The reducing agent tank module according to claim 2, further comprising a pipe wound by Nichrome wire, wherein the supply module includes an upper surface that the pipe is connected to.

10. The reducing agent tank module according to claim 1, wherein the first lateral surface slopes down in a first lateral direction.

* * * * *